(No Model.) 2 Sheets—Sheet 1.

G. DE LAVAL.
APPARATUS FOR WORKING CENTRIFUGAL MACHINES.

No. 368,328. Patented Aug. 16, 1887.

(No Model.) 2 Sheets—Sheet 2.

G. DE LAVAL.
APPARATUS FOR WORKING CENTRIFUGAL MACHINES.

No. 368,328. Patented Aug. 16, 1887.

Witnesses
Chas H. Smith
Harold Serrell

Inventor
Gustaf de Laval
per Lemuel W. Serrell
atty.

UNITED STATES PATENT OFFICE.

GUSTAF DE LAVAL, OF STOCKHOLM, SWEDEN.

APPARATUS FOR WORKING CENTRIFUGAL MACHINES.

SPECIFICATION forming part of Letters Patent No. 368,328, dated August 16, 1887.

Application filed January 17, 1887. Serial No. 224,555. (No model.)

*To all whom it may concern:*

Be it known that I, GUSTAF DE LAVAL, a subject of the King of Sweden, and a resident of Stockholm, Sweden, have invented a new and useful Improvement in Apparatus for Supporting and Working Centrifugal Machines, such as Cream - Separators and the Like, by Hand-Power, of which the following is a specification.

The object of this invention is to provide a practical and compact apparatus for supporting and operating vertically-mounted centrifugal cream-separators and the like by handpower, the arrangement being such as to enable very rapid rotary motion—six or seven thousand revolutions a minute, if desired—to be imparted to such a machine by means of a spur-wheel gearing and a worm-wheel gearing direct without the use of belt, string, or friction-wheels, and the apparatus has small dimensions. My cream - separator arranged in this way with forty revolutions on the crank-handle and six thousand revolutions on the separator-vessel skims sixty liters per hour.

Figure 1:
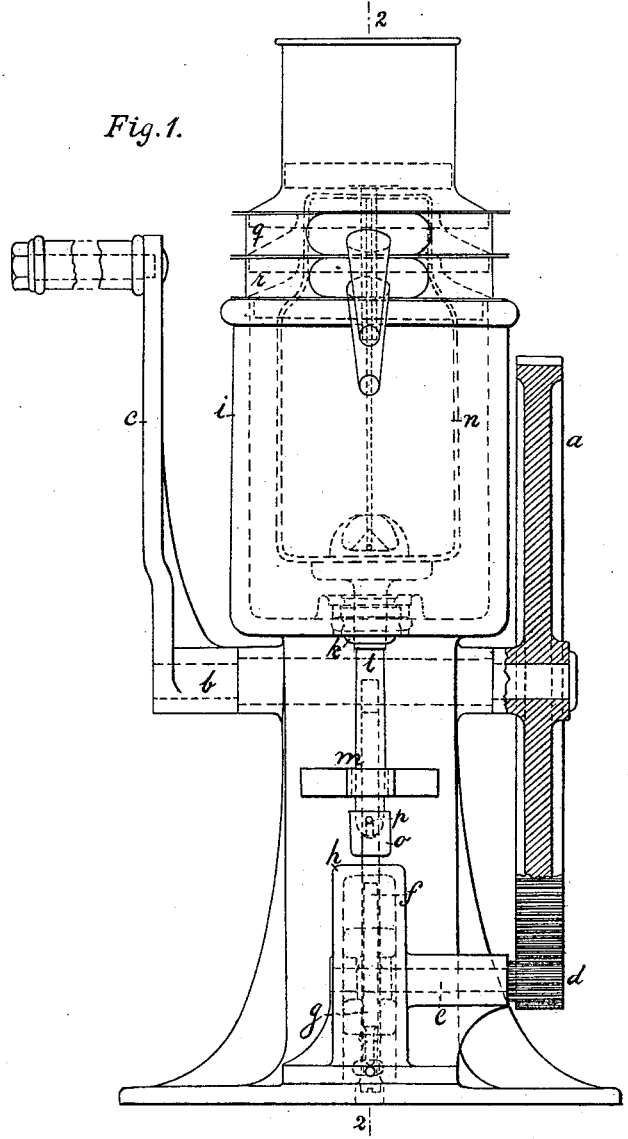
Figure 2:
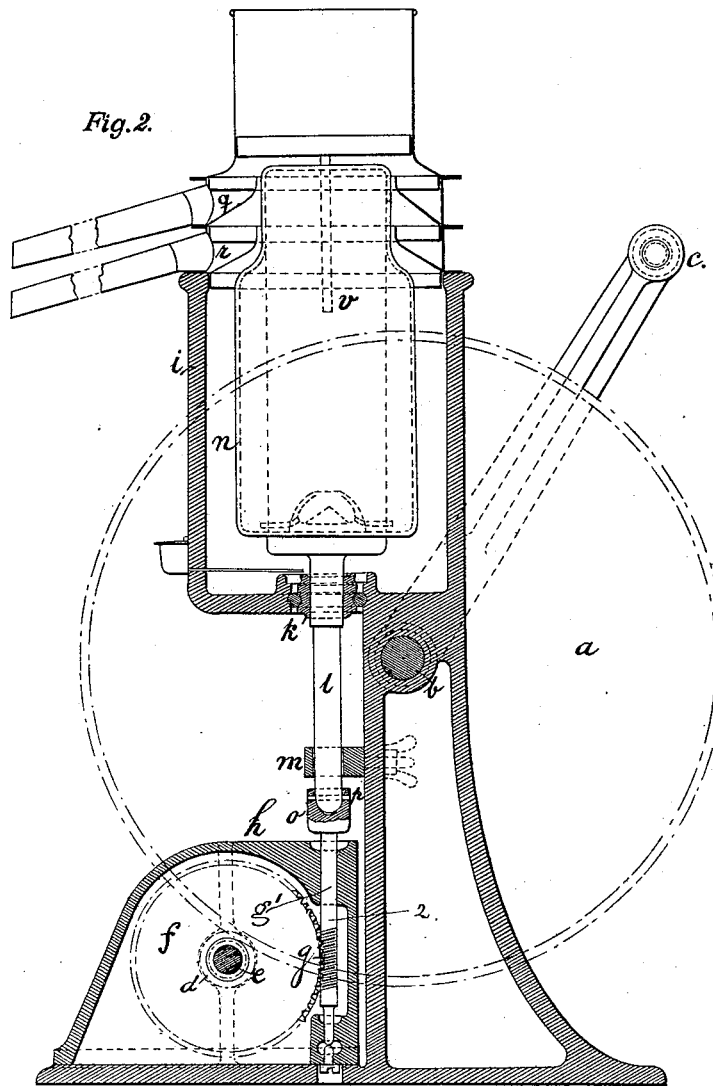

In the accompanying drawings, Figure 1 is an elevation with the gear-wheel partially in section, and Fig. 2 is a section of the stand or frame and an elevation of the cream-separator and shafts.

*a* is a spur-wheel, *b* its shaft, and *c* a crank; *d*, the pinion gearing with wheel *a*, and *e* its shaft. On this shaft *e* is a worm-wheel, *f*, that gears with a worm, *g*, on a vertical shaft, *g'*, mounted in bearings. On the top of this worm-shaft is a socket or coupling, *o*, receiving the lower end of the shaft *l* of the revolving apparatus. The worm-wheel gearing has its bearings in and is surrounded by a casing, *h*, attached to the bed - plate of the stand. The stand is furnished at its upper end with a casing, *i*, around centrifugal separating-vessel *n*.

*k* is a bearing for the spindle or shaft *l* of the rotatory apparatus, and *m* is a collar intended to prevent the said spindle from swinging out in the event of its getting loose from the coupling or socket *o*.

The revolving vessel *n* and its shaft *l* are revolved by the crank *c*, gear-wheel *a*, pinion *d*, worm-gear *f*, worm *g*, shaft *g'*, and the socket or friction-coupling *o*. *v* is the inlet-pipe for the milk, and *q r* the ordinary receptacles for the cream and the skimmed milk.

When used, the bed-plate of the stand is attached to a table or any other suitable support.

I claim as my invention—

The combination, with the shaft *l*, adapted to support the centrifugal vessel upon the same, and the bearings for such shaft, of the vertical worm *g* and its shaft *g'*, the coupling *o*, connecting the shaft *l* to the shaft of the worm, the worm-wheel *f*, acting to revolve the worm *g*, the shaft *e*, pinion *d*, gear - wheel *a*, shaft *b*, and crank *c* for giving rotation to the parts, and the bed-plate and stand, and the casing *h*, attached to the bed-plate and supporting the worm-shaft *g* and shaft *e*, substantially as specified.

Signed by me this 23d day of December, A. D. 1886.

GUSTAF DE LAVAL.

Witnesses:
 TOM ÖRTEUQUEN,
 N. SWENSSON.